(12) United States Patent
Vasudevan

(10) Patent No.: US 8,899,326 B2
(45) Date of Patent: Dec. 2, 2014

(54) OIL RECOVERY PROCESS

(75) Inventor: Meenatchinathan Vasudevan, Lincoln, NE (US)

(73) Assignee: Cleaver-Brooks, Inc., Lincoln, NE (US)

(*) Notice: Subject to any disclaimer, the term of this patent is extended or adjusted under 35 U.S.C. 154(b) by 641 days.

(21) Appl. No.: 13/185,797

(22) Filed: Jul. 19, 2011

(65) Prior Publication Data

US 2013/0020078 A1 Jan. 24, 2013

(51) Int. Cl.

| | | |
|---|---|---|
| *E21B 43/24* | (2006.01) | |
| *F22B 35/08* | (2006.01) | |
| *F22B 29/02* | (2006.01) | |
| *F22B 29/06* | (2006.01) | |
| *C02F 9/00* | (2006.01) | |
| C02F 1/20 | (2006.01) | |
| C02F 1/44 | (2006.01) | |
| C02F 1/42 | (2006.01) | |
| C02F 5/06 | (2006.01) | |
| C02F 1/00 | (2006.01) | |
| C02F 1/24 | (2006.01) | |
| C02F 1/60 | (2006.01) | |
| C02F 1/66 | (2006.01) | |
| C02F 1/68 | (2006.01) | |
| C02F 101/32 | (2006.01) | |
| C02F 1/469 | (2006.01) | |
| C02F 1/04 | (2006.01) | |
| C02F 103/36 | (2006.01) | |

(52) U.S. Cl.

CPC .............. *C02F 9/00* (2013.01); *C02F 2301/046* (2013.01); *C02F 1/20* (2013.01); *C02F 1/44* (2013.01); *F22B 35/08* (2013.01); *C02F 2001/425* (2013.01); *C02F 5/06* (2013.01); *F22B 29/02* (2013.01); *C02F 1/004* (2013.01); *F22B 29/064* (2013.01); *E21B 43/2406* (2013.01); *C02F 1/24* (2013.01); *C02F 1/60* (2013.01); *C02F 1/66* (2013.01); *C02F 1/681* (2013.01); *C02F 2101/32* (2013.01); *C02F 2130/10* (2013.01); *C02F 1/4695* (2013.01); *C02F 1/048* (2013.01); *C02F 2001/427* (2013.01); *C02F 2303/20* (2013.01); *C02F 2103/365* (2013.01)

USPC ............... 166/266; 166/75.12; 166/272.3; 166/57; 122/6 R

(58) Field of Classification Search

USPC ......... 166/75.11, 90.1, 75.12, 272.3, 57, 266; 122/6 R, 459, 460

See application file for complete search history.

(56) References Cited

U.S. PATENT DOCUMENTS 3,353,593 A * 11/1967 Boberg ..................... 166/252.1
3,357,407 A * 12/1967 Fanaritis ..................... 122/1 R (Continued)

*Primary Examiner* — Robert E Fuller
(74) *Attorney, Agent, or Firm* — Coats and Bennett PLLC

(57) ABSTRACT

An oil recovery process entails recovering an oil-water mixture from an oil bearing formation and separating the oil-water mixture to produce an oil product and produced water. The produced water includes suspended and dissolved solids and is subjected to treatment which removes suspended and dissolved solids therefrom. The treated water is then directed to a forced circulation steam generator that includes a furnace having a burner, water cooled walls and an evaporator unit. The treated water is pumped through the water cooled walls and the evaporator unit. The water passing through the water cooled walls and evaporator unit are heated to produce approximately 10% to approximately 30% quality steam in both the water cooled walls and the evaporator unit. The steam is collected and separated from a water-steam mixture to produce high quality steam, on the order of 95% or greater quality steam. This steam constitutes injection steam which is injected into an injection well to facilitate the recovery of the oil-water mixture.

15 Claims, 9 Drawing Sheets

(56) References Cited

U.S. PATENT DOCUMENTS

| | | | |
|---|---|---|---|
| 3,918,521 A * | 11/1975 | Snavely et al. | 166/272.3 |
| 4,474,011 A * | 10/1984 | Nelson et al. | 60/648 |
| 4,967,837 A * | 11/1990 | Danzik | 166/270.1 |
| 6,733,636 B1 * | 5/2004 | Heins | 203/1 |
| 7,150,320 B2 * | 12/2006 | Heins | 166/266 |
| 7,533,632 B2 * | 5/2009 | Stone et al. | 122/235.12 |
| 7,591,311 B2 * | 9/2009 | Minnich et al. | 166/272.3 |
| 2010/0058771 A1 * | 3/2010 | Gil et al. | 60/780 |
| 2010/0200231 A1 * | 8/2010 | Minnich | 166/272.3 |
| 2013/0019817 A1 * | 1/2013 | Vasudevan | 122/235.11 |
| 2013/0269934 A1 * | 10/2013 | Bjorklund et al. | 166/266 |

* cited by examiner

US 8,899,326 B2

OIL RECOVERY PROCESS

FIELD OF THE INVENTION

The present invention relates to oil recovery processes and more particularly to oil recovery processes that treat produced water and utilize a steam generator to produce steam from the treated produced water and inject the steam into an injection well.

BACKGROUND

Steam assisted gravity discharge (SAGD) refers to a widely used process where high pressure steam is injected into an injection well to melt bitumen or to generally reduce the viscosity of heavy oil to facilitate its removal. The bitumen or heavy oil and condensed steam flows by gravity to drain pipes buried below the oil deposit and the bitumen or oil is pumped out as an oil-water mixture. Once the oil-water mixture is pumped to the surface, a number of processes are utilized to treat the oil-water. First, oil is separated from the oil-water mixture to yield an oil product and produce water. The produced water is then treated to remove total dissolved solids and suspended solids. Various types of treatments can be employed such as filters for removing suspended solids and warm lime softeners or evaporators to remove dissolved solids. Cyclic Steam Simulation (CSS) process also works in the same principle as SAGD process with intermittent steam injection followed by oil-water mixture extraction.

There are several types of steam generators that can be utilized to generate steam for use in a SAGD process for example. One type of steam generator is referred to as the once through steam generator. Once through steam generators have a number of disadvantages or drawbacks. They tend to have high blowdown and hence this gives rise to thermal inefficiencies and water wastage. Once through steam generators typically utilize inline steam separators and this results in additional blow down and additional heat recovery equipment. Many once through steam generators are designed with refractory/insulated furnaces. These typically require substantial maintenance. In addition, once through steam generators have uncooled supports for supporting steam generation coils. This also leads to high maintenance. With once through steam generators the turn down is limited and they typically have very complex flow circuits to manage. Moreover, the steam capacity is limited to about 300,000 LB/HR. Typically once through steam generators require a relatively large footprint and the capital cost is high. When once through steam generators are used in heavy oil recovery processes such as commercial bitumen production, the resulting designs require numerous one through steam generation units and this results in high capital and operating costs.

A second type of steam generator is what is referred to as a drum boiler. Drum boilers have limited operating experience in heavy oil recovery processes and in particular, have not been widely used with feed water from an evaporator. Further, there is not a great deal of experience with drum boilers in handling upsets in water quality, a real concern for oil producers. Furthermore, with drum boilers it is expensive and time consuming to clean the tubes of the drum boiler. Finally, mechanical tube failures that result from water quality issues are expensive to repair.

Therefore, there is and continues to be a need for a steam generator design for use in heavy oil recovery processes that overcomes the shortcomings and disadvantages of once through steam generators and drum boilers.

SUMMARY

The present invention relates to a method of recovering oil and producing steam for injection into an injection well to assist in the recovery of oil. The method includes recovering an oil-water mixture from an oil bearing formation. The oil-water mixture is separated into an oil product and produced water which includes suspended solids and dissolved solids. The produced water is directed to a treatment system that removes suspended solids and dissolved solids from the produced water. This yields treated water. The treated water is then directed to a forced circulation steam generator that includes a furnace having a burner and at least one water cooled wall and an evaporator unit. The treated water is pumped through the water cooled wall and the evaporator unit. The water being pumped through the water cooled wall and the evaporator unit is heated and yields a water-steam mixture that comprises approximately 10% to 30% quality steam. The water-steam mixture is then directed to a steam drum that separates the steam from the water-steam mixture to form injection steam that comprises 95% or more quality steam. The injection steam is then injected into an injection well to facilitate recovery of the oil-water mixture from the oil bearing formation.

Other objects and advantages of the present invention will become apparent and obvious from a study of the following description and the accompanying drawings which are merely illustrative of such invention.

DETAILED DESCRIPTION

Figure 1:
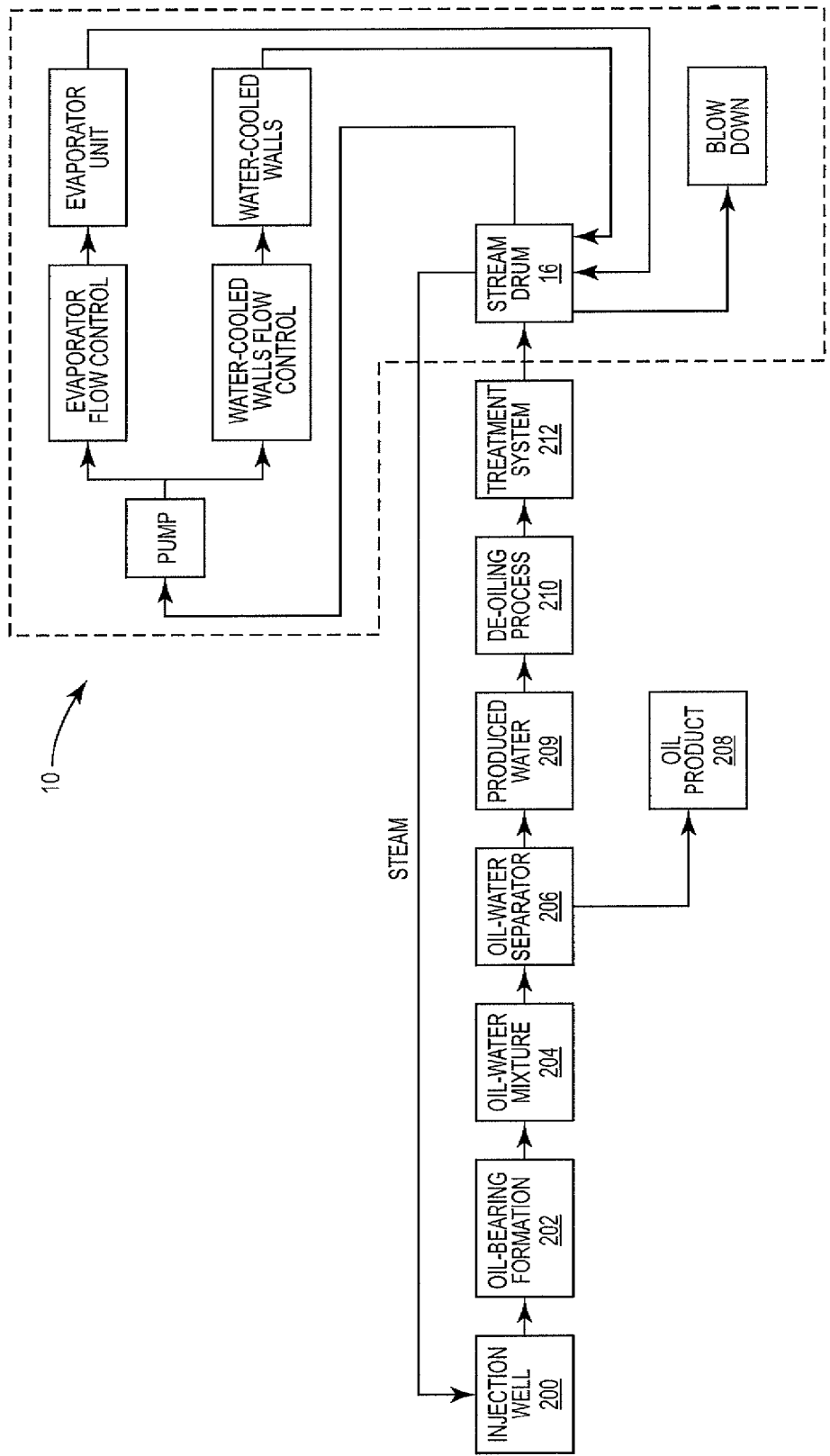
FIG. 1 is a schematic illustration of the oil recovery process of the present invention.
Figure 2:
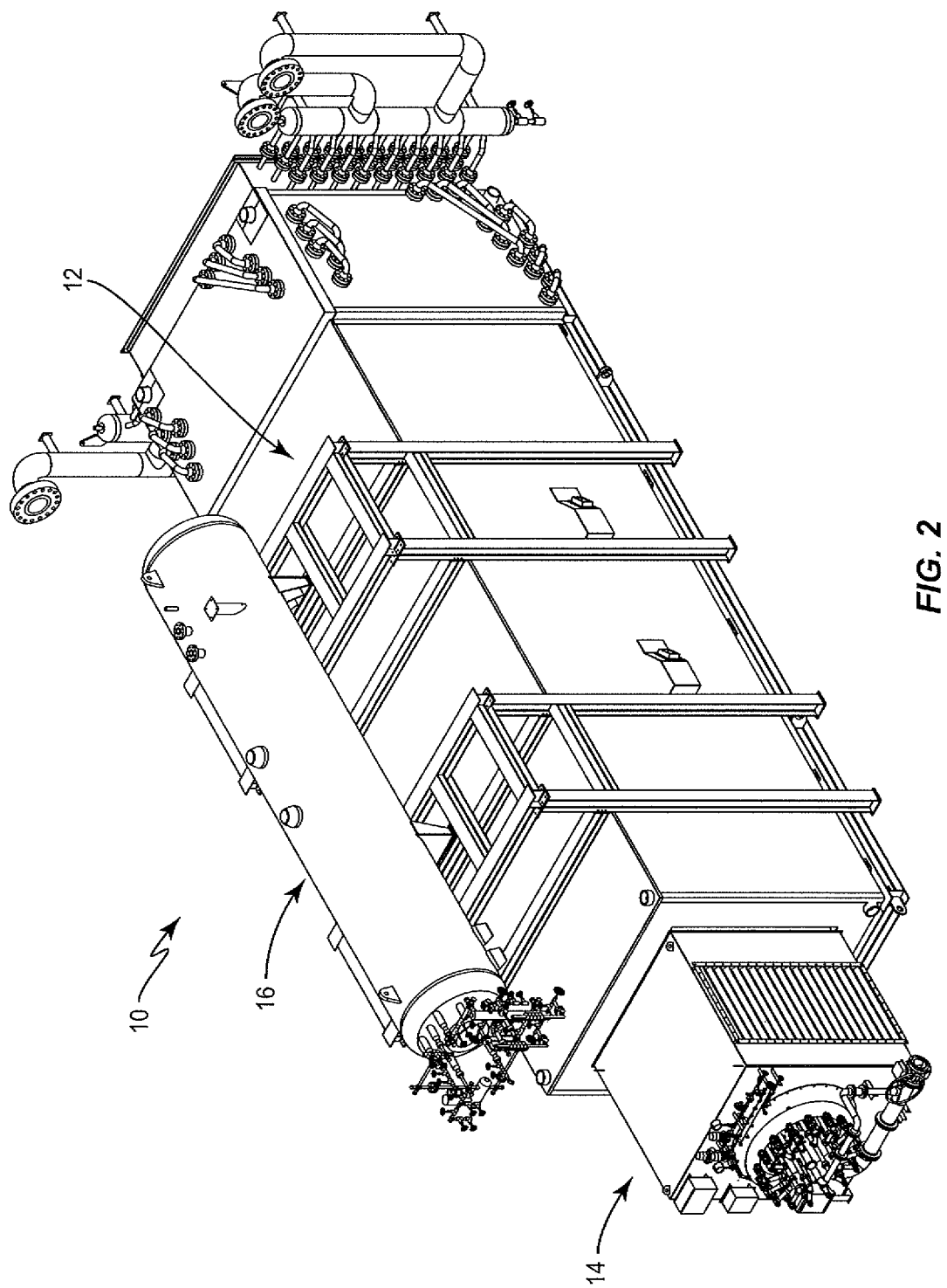
FIG. 2 is a perspective view of the forced circulation steam generator of the present invention.
Figure 3:
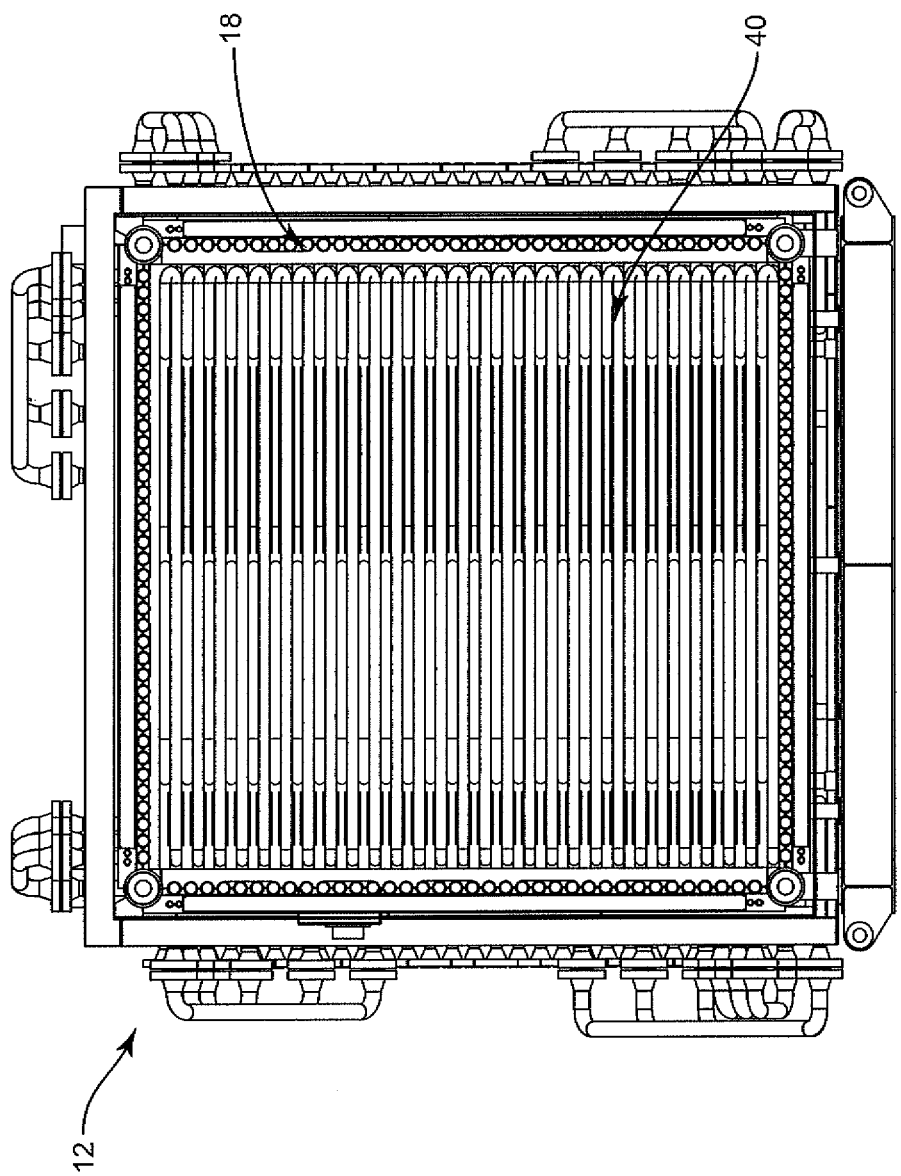
FIG. 3 is a cross-sectional view of the furnace of the steam generator as shown in FIG. 2.

With reference to the drawings, particularly FIG. 1, there is shown therein an oil recovery process that employs a forced circulation steam generator 10. As will be appreciated from subsequent portions of the disclosure, the forced circulation steam generator 10 functions to produce steam that is injected into an injection well 200 that is typically spaced from an oil well or oil bearing formation. More particularly, in one embodiment, the present invention is a heavy oil recovery process that employs steam assisted gravity discharge, commonly referred to as a SAGD process.

Viewing FIG. 1 in more detail, the forced circulation steam generator 10 produces steam that is directed into the injection well 200. Once in the injection well 200, the steam functions to fluidize heavy oil, sometimes referred to as bitumen, in the oil bearing formation which is typically horizontally separated from the injection well 200. The process of the present invention can be utilized in a wide range of heavy oil recovery processes where it is desired to utilize steam to facilitate the removal of heavy oil from an oil bearing formation. For example, one area in the world that is particularly suited for the process disclosed herein is the tar sands region in Alberta, Canada for example.

Steam entering the injection well 200 eventually condenses and an oil-water mixture 204 results and this oil-water mixture moves through the oil bearing formation 202. Eventually the oil-water mixture 204 is consolidated in an oil-water gathering well and the oil-water mixture 204 is pumped to the surface.

Once the oil-water mixture 204 reaches the surface, it is directed to an oil-water separator 206. Oil separator 206 separates oil from the mixture and produces an oil product 208. The remaining water is referred to as produced water 209. The produced water 209, after separation from the oil, is further de-oiled by a de-oiling process 210. De-oiling process 210 may be accomplished in various ways such as by utilizing a dissolved air flotation system with the assistance of the addition of a de-oiling polymer.

After the de-oiling process 210 and prior to the produced water reaching the forced circulation steam generator 10 it is necessary to treat the produced water to remove contaminants such as suspended solids and total dissolves solids (TDS) including contaminants such as hardness and silica. At various points downstream from the de-oiling process 210, various types of filtration devices, such as nutshell filters, multimedia filters, membranes, etc. can be employed to remove suspended solids or particulates from the produced water. These processes are generally included in the section of the process denoted treatment system 212 in FIG. 1. There are various processes that may be utilized in the treatment section 212 to deal with hardness, silica, organics and other dissolved solids. For example, warm lime softeners in combination with downstream filtration devices and ion exchange units can be utilized to remove hardness and silica as well as other dissolved solids. In the alternative, evaporators can be utilized to remove hardness, silica and other dissolved solids and again further downstream polishing processes can be utilized to purify a distillate produced by the evaporator. In the end, it is the aim of the process of the present invention to remove sufficient contaminants from the produced water before entering the forced circulation steam generator so as to prevent scaling and fouling of metal surfaces found in the steam generator and any associated equipment.

Various softening chemicals such as lime, flocculating polymer and soda ash may be used in a warm lime softening process. Typically the warm lime softener produces waste sludge which can be further treated and disposed. As noted above, polishing downstream from the warm lime softener can include an ion exchange process which typically includes hardness removal by a weak acid cation ion exchange system that can be utilized to remove hardness and in some cases at least some alkalinity.

Various types of evaporators can be utilized to treat the produced water prior to reaching the steam generator 10. For example, the produced water 209 can be treated and conditioned in a mechanical vapor recompression evaporator. Such an evaporator will concentrate the incoming produced water. Pretreatment prior to reaching the evaporator can be employed when necessary. For example sulfuric acid or hydrochloric acid can be used to lower the pH of the produced water prior to reaching the evaporator so that bound carbonates are converted to free gaseous carbon dioxide which can be removed along with other dissolved gases by an upstream deaerator. After pretreatment, if necessary, the produced water is directed to the evaporator which produces a concentrated brine and steam which condenses to form a distillate. Generally the concentrated brine in the evaporator is recirculated and a small portion of the recirculating concentrated brine is removed. In the evaporator, the dissolved solids in the produced water are concentrated since water is being removed from the produced water.

In some cases, the distillate produced by the evaporator may require further treating to remove organics and other residual dissolved solids. In some cases it may be necessary to remove ions from the distillate produced by the evaporator. In many cases the residual dissolved solids in the distillate include salts other than hardness. In one process, the removal of dissolved solids downstream from the evaporator can be accomplished by passing the distillate, after being subjected to a heat exchanger, through an ion exchange system. Such ion exchange systems may be of the mix bed type and aimed at removing selected solids. In other designs, the removal of residual dissolved solids can be accomplished by passing the distillate through a heat exchanger and then through an electrodeionization (EDI) system. The reject or waste stream from all of these polishing processes can be recycled upstream of the evaporator for further treatment by the evaporator. As noted above, various treatment systems 212 can be utilized upstream of the steam generator to remove various contaminants from the produced water stream. It is contemplated that utilizing evaporators to remove total dissolved solids from the produced water stream may be preferable. But it is understood and appreciated that other pretreatment processes may be employed to treat the produced water prior to its introduction into the downstream generator.

Downstream of the treatment system 212 is the forced circulation steam generator 10. Details of the forced circulation steam generator 10 will be discussed later but it is beneficial to briefly review the forced circulation steam generator and discuss how it receives the treated produced water from the treatment system 212 and produces steam for injection into the injection well 200. Generally the effluent from the treatment system 212 is directed to a steam drum 16 that forms part of the forced circulation steam generator 10. Water from the steam drum 16 is pumped by one or more pumps through what can generally be described as two heat exchanger systems or circuits incorporated into the furnace of the steam generator 10. First there is an evaporator unit contained in the furnace. In addition there is provided water cooled walls that form a part of the furnace unit. The one or more pumps pump water from the steam drum 16 through both the evaporator unit and the water cooled walls. In each case a water-steam mixture is produced and returned to the steam drum 16. The forced circulation steam generator 10 includes flow controls for independently controlling the flow of water through the evaporator unit and the water cooled walls such that approximately 10% to approximately 30% quality steam is produced in each circuit. Steam drum 16 separates steam from the water in the steam drum 16 and produces a steam that exceeds 95% quality steam and in a preferred embodiment produces 99% or higher quality steam. Steam produced by the steam drum 16 is directed into the injection well 200. Steam drum 16 also produces a blow down stream that is on the order of 1 to 2% compared to the feed to the steam drum.

Turning to FIGS. 2-9, the forced circulation steam generator 10 is shown therein in more detail. The forced circulation steam generator 10 comprises three basic components: a furnace indicated generally by the numeral 12, a burner indicated generally by the numeral 14, and a steam drum indicated generally by the numeral 16. As discussed above, water from the steam drum 16 is forced and circulated through water cooled walls forming a part of the furnace 12 and through an evaporator unit indicated generally by the numeral 40. Burner 14 supplies heat to the furnace 12 that heats the water passing through the water cooled walls and the evaporator unit 40 resulting in a water-steam mixture being produced in the water cooled walls and the evaporator unit. The water-steam mixtures are directed to the steam drum 16 where the steam is separated from the water. One of the features of the forced circulation steam generator 10 of the present invention is that the heat supplied by the burner 14 and the flow of water through the water cooled walls and the evaporator 40 are controlled so as to limit the quality of steam produced in the water cooled walls and the evaporator unit. As discussed below, controls are instituted such that the water cooled walls and the evaporator unit 40 produce steam that is 30% or less quality steam. Furthermore, the amount of water pumped and circulated through the water cooled walls and the evaporator unit 40 is substantially greater than the amount of steam produced by the water cooled walls and the evaporator unit 40. In one design illustrated herein, the amount of water pumped from the steam drum 16 to and through the water cooled walls and evaporator unit 40 is greater than five times the amount of steam produced in the water cooled walls and the evaporator unit 40. In a steam generator circulation circuit context, the flow of water and steam is expressed lbs\hr unit or as a ratio of water to steam flow in the circuits. In this particular case the flow of water into the two circuits is at least a 5:1 circulation ratio. That is, the flow of water from the steam drum 16 into the two circuits is at least 5 parts water to 1 part of steam produced in the circuits. That is, 5 parts of water directed into the two circuits exits the two circuits as 4 parts water and 1 part steam. This enables a relatively high wetted area in both water cooled walls and evaporator circuits and resultant lower tube wall temperatures. The quality steam produced at the steam drum exceeds 95% and in a preferred design is 99% greater.

Forced circulation steam generator 10 comprises a furnace indicated generally by the number 12. See FIG. 7. Furnace 12 comprises water cooled walls. In the embodiment contemplated herein, the sides, bottom and top of the furnace 12 includes water cooled walls.

The water cooled walls are shown in FIGS. 4A, 4B, 6 and 7. The water cooled walls form a part of a wall assembly that is particularly illustrated in FIG. 6. Essentially each water cooled wall includes a heat exchanger module indicated generally by the numeral 18. See FIG. 4B. Each heat exchanger module 18 includes a series of parallel tubes or pipes through which water flows. In the embodiment illustrated herein, each side as well as the top and bottom of the furnace 12 will include a heat exchanger module 18. That is, for example, one module 18 (shown in FIG. 4B) would extend along one side of the furnace 12. Likewise, one module 18 would extend along the top of the furnace and another module 18 would extend along the bottom of the furnace. In the end, all of the exterior walls of the furnace 12 would include a module that would enable the exterior walls to be water cooled. Each module 18 includes a series of tube elements with each tube element being indicated generally by the numeral 20 and shown in FIG. 4A. In the case of the module 18 shown in FIG. 4B, the same includes multiple tube elements 20 that are stacked or nested together. Each tube element 20, shown in FIG. 4A, includes a water inlet 20A, an outlet 20B, and a series of parallel tube segments 20C. Each tube element 20 is designed such that a series of the tube elements can be integrated to form the module 18 in such a fashion that the tube segments 20C lie in generally the same plane.

Module 18 includes a plurality of webs or fins 22. These are elongated pieces of metal that are welded between the respective tube segments 20C. The tube segments or sections 20C along with the fins 22 form a generally impervious wall.

Figure 4B:
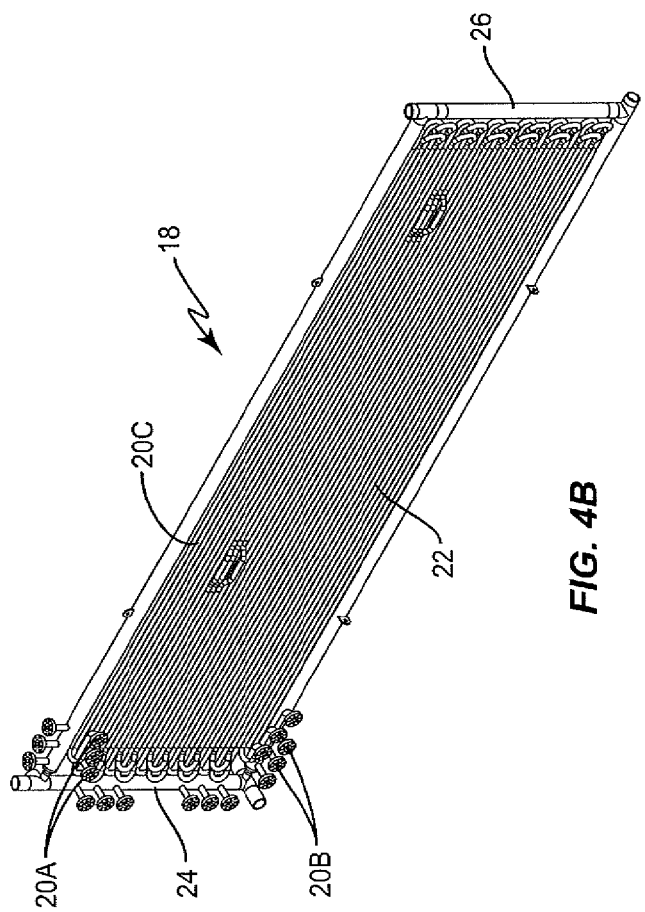
FIG. 4B is a perspective view of the heat exchanger module comprised of a series of tube elements.
Figure 4A:
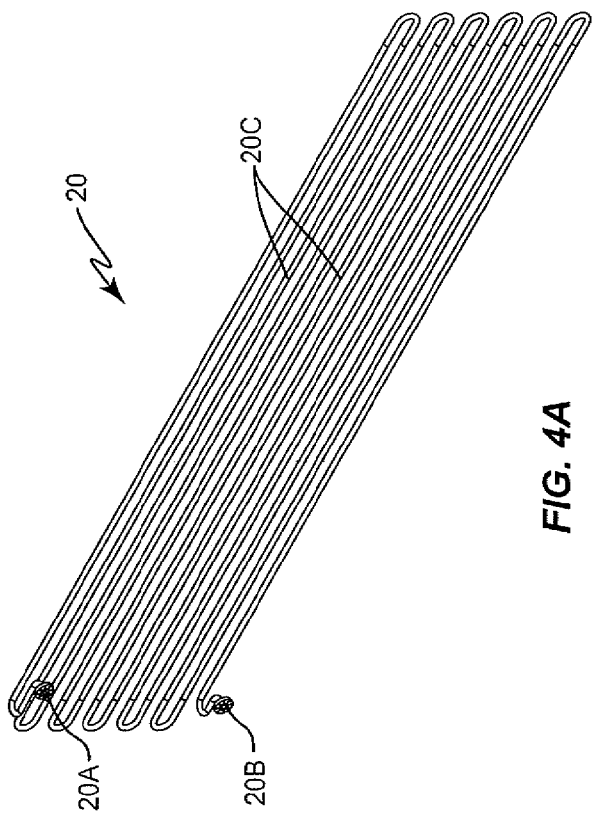
FIG. 4A is a perspective view of a tube element that forms a part of a heat exchanger module.

Continuing to refer to FIG. 4B and the module 18, it is seen that the module includes a surrounding frame structure that imparts rigidity to the module and at the same time functions as a manifold for directing inlet water into the various tube elements 20 and for directing a water-steam mixture from the various tube elements. In the particular embodiments shown herein, the manifold structure being referred to includes an inlet manifold 24 and an outlet manifold 26. Inlet manifold 24 for each module 18 is connected directly or at least indirectly to a source of water and to the inlet 20A. Outlet manifold 26 is connected to the outlet 20B of each module 18 and is also directly or indirectly connected to a fluid connection between the furnace and the steam drum 16.

Figure 6:
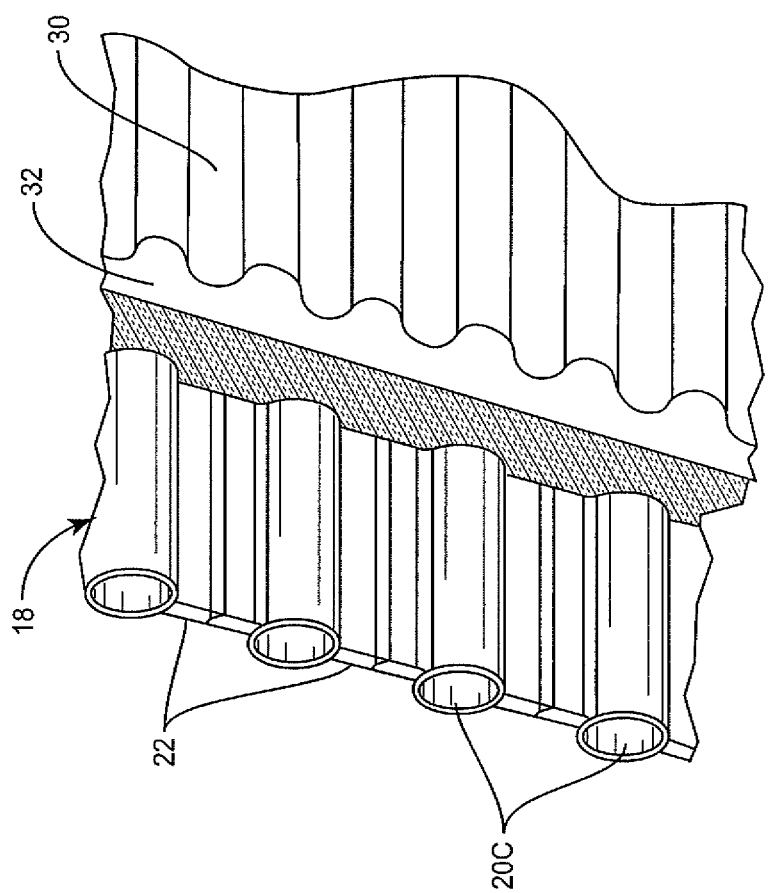
FIG. 6 is a fragmentary perspective view showing a water cooled wall assembly of the furnace that forms a part of the steam generator.

Module 18 comprises a part of an exterior wall that is partially shown in FIG. 6. Module 18 is disposed along the inside of the wall assembly. Disposed outside of the wall assembly is an outer skin 30. Disposed between the module 18 and the skin 30 is an insulation layer 32. In one embodiment of the present invention, the wall assembly shown in FIG. 6 forms the side walls, top and bottom of the furnace 12.

Figure 7:
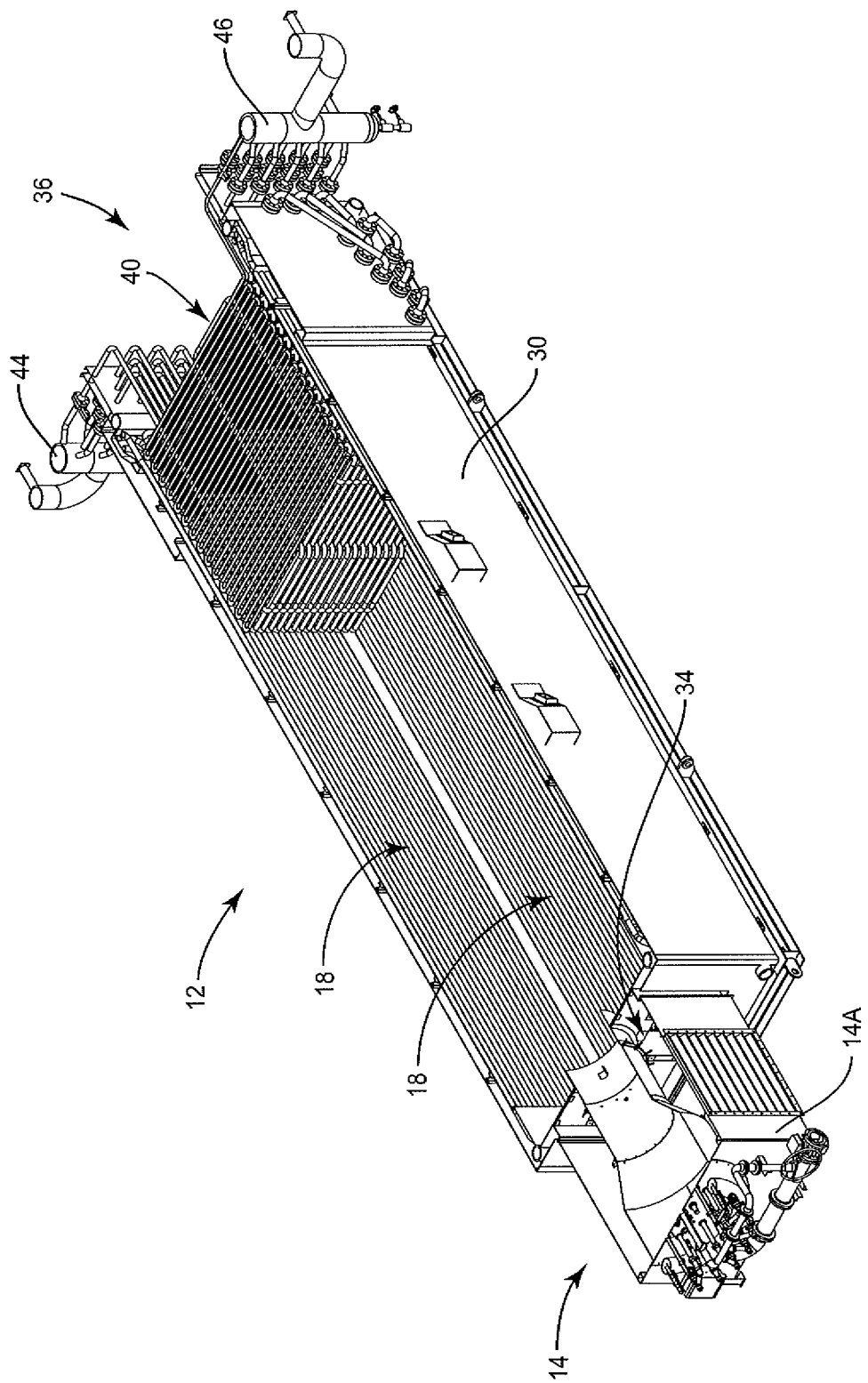
FIG. 7 is a perspective cut-away view illustrating portions of the furnace of the steam generator as well as the water cooled walls and evaporator unit in the furnace.

As viewed in FIG. 7, the left end of the furnace 12 includes an opening 34 that permits the flame to be projected from the burner 14 into the furnace 12. Continuing to refer to FIG. 7, the right end of the furnace 12 also includes an opening indicated generally by the numeral 36 for permitting exhaust gases to be exhausted form the steam generator 10.

Figure 5B:
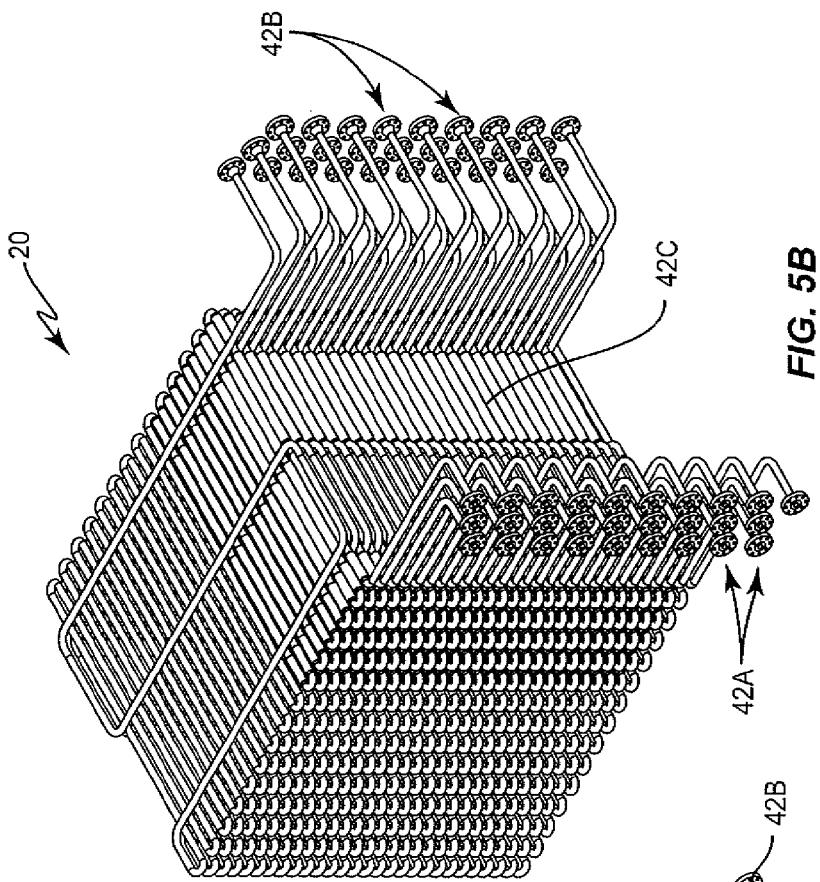
FIG. 5B is a perspective view of the evaporator unit.
Figure 5A:
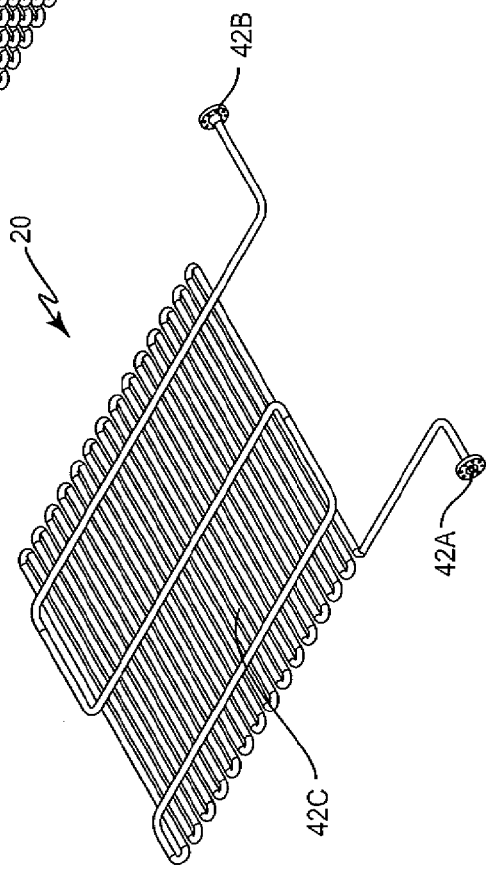
FIG. 5A is a perspective view of a tube element that makes up an evaporator unit.

Returning to the evaporator unit 40, as shown in FIG. 5B, the evaporator unit includes a series of stacked tube elements indicated generally by the numeral 42. FIG. 5A shows one tube element 42. Each tube element 42 includes an inlet 42A and an outlet 42B. In addition, each tube element 42 includes a series of parallel tube segments or sections 42C. Evaporator unit 40 is formed by stacking a series of the tube elements 42 one over the other. Like the modules 18, the evaporator unit 40 is communicatively connected to at least two manifolds that facilitate the flow of water into the evaporator unit 40 and which receive the water-steam mixture produced by the evaporator unit. As seen in FIG. 7, there is provided an inlet manifold 44 that is operatively connected to the inlets 42A of the tube elements 42. Further, there is provided an outlet manifold 46 that is operatively connected to the outlets 42B of the tube elements 42. Thus, it is appreciated that water entering the evaporator unit 40 passes into and through the inlet manifold 44 while the water-steam mixture produced by the evaporator unit is directed out the outlet manifold 46. As seen in FIG. 7, the evaporator unit 40 is disposed in an end portion of the furnace 12 opposite the burner 14.

As seen in FIG. 1, the forced circulation steam generator 10 includes a steam drum indicated generally by the numeral 16. As is appreciated, the steam drum 16 functions to receive water-steam mixtures from the wall modules 18 and the evaporator unit 40. Once the steam mixtures have been received in the steam drum 16, the steam drum functions to separate the steam from the water. The system and process disclosed herein is designed to result in the steam drum 16 producing a very high quality steam, a quality steam of at least 95% and in a preferred system and process a quality steam of 99% or more.

Figure 9:
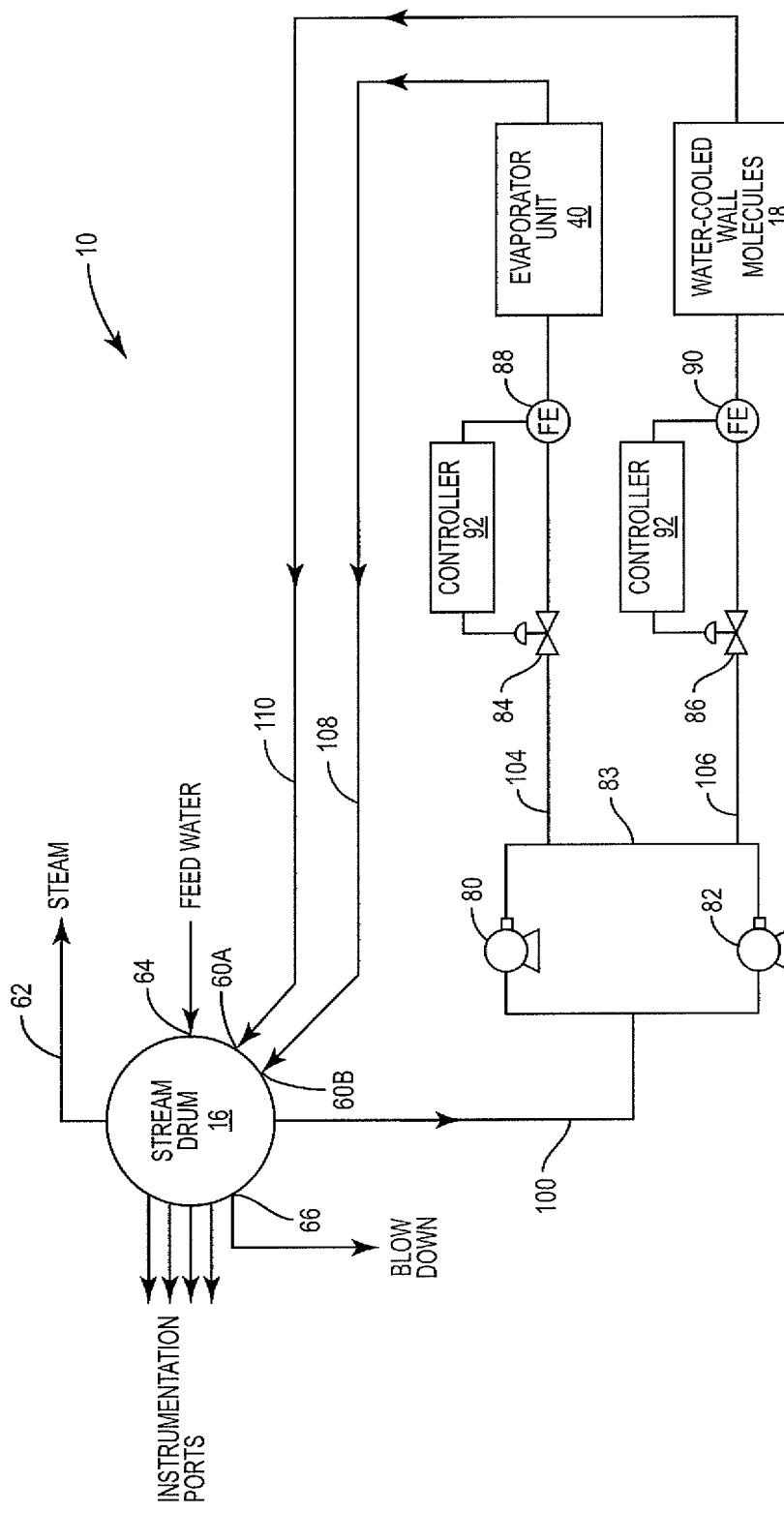
FIG. 9 is a schematic illustration showing the basic operation of the forced circulation steam generator of the present invention.

FIG. 9 is a schematic illustration showing the steam drum 16. The steam drum includes inlets 60A and 60B with inlet 60A being operative to receive the water-steam mixture from the wall modules 18 while inlet 60B is operative to receive the water-steam mixture from the evaporator unit 40. Further, the steam drum 16 includes various ports for enabling access for sensors and other instruments.

The forced circulation steam generator 10 is powered with a conventional gas burner 14. Details of the burner 14 are not dealt with herein because such is not per se material to the present invention and further, burners of the type employed in the forced circulation steam generator 10 are well known and conventional. One exemplary burner 14 that is suitable for the forced circulation steam generator 10 is the "NATCOM" Ultra Low $NO_x$ burner supplied by Cleaver-Brooks of Lincoln, Nebr. Briefly, however, the burner 14 is at least partially housed in a housing 14A. See FIGS. 2 and 7. Burner 14 is mounted in the housing 14A at the left end of the furnace 12 as viewed in FIG. 7. In this position the burner 14 shoots a substantial flame into the left end of the furnace 12 and in the process is effective to heat water passing through the water cooled walls as well as the evaporator unit 40.

Turning to FIG. 9, shown therein is a schematic illustration showing basic components of the forced circulation steam generator 10 and how steam is produced and injected into the injection weld 200. As shown in FIG. 9, the forced circulation steam generator includes a pair of pumps 80 and 82. Pumps 80 and 82 can be of various types but in one embodiment they are centrifugal pumps and their output or flow is generally a function of pressure. Pumps 80 and 82 are connected to an outlet of the steam drum 16 via line 100. Furthermore, the pumps 80 and 82 are operatively interconnected between the evaporator unit 40 and the water cooled wall modules 18 and the steam drum 16. Pumps 80 and 82 function to pump water from the steam drum 16 through the evaporator unit 40 and the water cooled wall modules 18.

As shown in FIG. 9, the output of the pumps 80 and 82 are coupled by line 83. Extending from line 83 are two lines 104 and 106 with line 104 functioning to feed the evaporator unit 40 and line 106 functioning to feed the water cooled wall modules 18. Disposed between the pumps and the evaporator unit 40 and the water cooled wall modules 18 is a flow control system which functions to vary the flow of water through the evaporator unit 40 and water cooled wall modules 18. The control mechanism utilized is a pair of flow sensors 88 and 90. Flow sensors 88 and 90 are each operatively connected to a controller 92. In the embodiment illustrated herein, two controllers are shown but it is appreciated that a single controller with the ability to produce a series of independent control signals could be utilized. In any event, each controller 92 is operatively connected with a flow control value 84 and 86. As noted above, the function of the controller 92 is to control the flow of water through the evaporator unit 40 and the water cooled wall modules 18. Controller 92 is programmed to exercise control based on one or more parameters or variables. The system and process is designed to produce approximately 10% to approximately 30% quality steam in each of the circuits, i.e., evaporator unit and the water cooled wall modules 18. It is known that there is a relationship between the burner firing rate and flow. That is, to achieve a certain quality steam, the firing rate and flow are directly proportional. That is, as the firing rate is increased, the flow should also increase. Further, as the firing rate is decreased, the flow should be decreased in order to produce the same quality steam. Therefore, the controller 92 is programmed to control the flow control valves 84 and 86 in response to the firing rate of the burner 14. Generally speaking, as the firing rate is increased, the flow control valves 84 and 86 are actuated so as to increase flow from the pumps 80 and 82 through the evaporator unit 40 and the water cooled wall modules 18. Likewise, as the firing rate of the burner 14 is decreased, the controllers 92 generally control the flow control valves 84 and 86 so as to generally decrease the flow of water through the evaporator unit 40 and the water cooled wall modules 18. As noted above, the controllers 92 can be programmed in various ways to achieve the desired quality steam produced. For example, in addition to firing rate, the controllers 92 could also be programmed to consider the water quality being fed into the evaporator unit 40 and the water cooled wall modules 18.

The forced circulation steam generator 10 and the basic system and process disclosed herein is designed to produce a relatively low steam quality in the evaporator unit 40 and the water cooled wall modules 18 compared to conventional once through steam generator (OTSG) or drum boilers. In particular, the quality steam of the water-steam mixtures produced by the evaporator unit 40 and the water cooled wall modules 18 is generally 50% or less. In one particular embodiment, the system and process is designed such that the evaporator unit 40 produces approximately 10% to approximately 30% of quality steam. Likewise, the system and process is designed and programmed such that the water cooled wall modules 18 produce approximately 10% to approximately 30% of quality steam. These two circuits are controlled independently. These steam qualities are conveyed in lines 108 and 110 to the steam drum 16. Once in the steam drum 16, the steam drum separates the steam from the steam-water mixtures. Here the steam drum 16 accumulates steam and produced steam directed out the outlet 62 is at least 95% quality steam and in a preferred design is 99% or more quality steam.

To achieve 99% or more of quality steam while only producing 10% to 30% quality steam in the evaporator unit 40 of the water cooled wall modules 18 it is necessary to direct substantially more water to and through the evaporator unit 40 and the water cooled wall modules 18 than the amount of steam produced by the evaporator unit and the water cooled wall modules. In a preferred design the flow of water from the steam drum 16 to the pumps 80 and 82 should be at least five times greater that the amount of steam produced by the evaporator unit 40 and the water cooled wall modules 18. Again, this means for every one part of steam produced in the evaporator unit 40 and the water cooled modules 18, that the flow of water from the steam drum 16 to the pumps 80 and 82 should be at least 5 parts water. That means that the ratio of the water pumped to the steam produced in the two circuits is at least 5:1.

Figure 8:
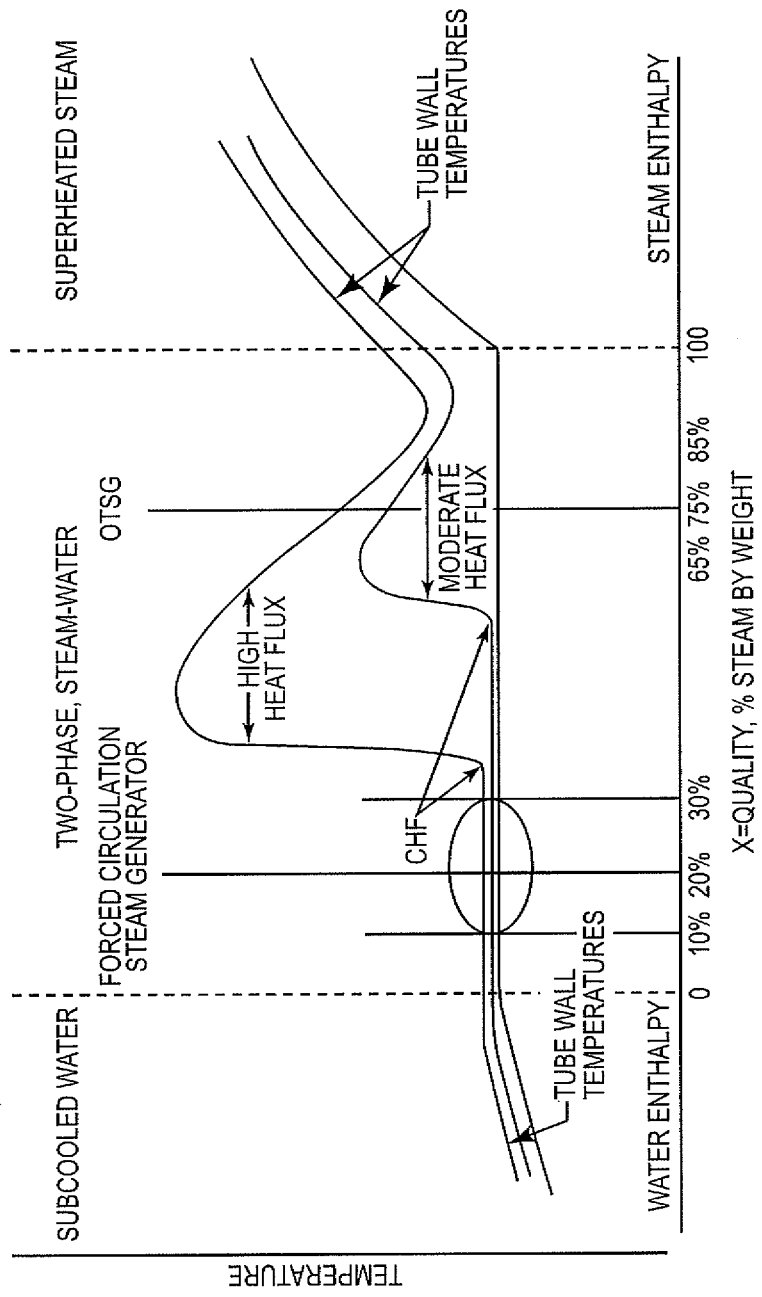
FIG. 8 is a graphical illustration showing the relationship between tube metal temperature and quality steam and particularly comparing tube metal temperature and quality steam of the forced circulation steam generator of the present invention with a conventional once through steam generator.

The forced circulation steam generator 10 is operated to assure that the temperatures of the heat exchange surfaces (i.e., the surface of the tubes or pipes that form the evaporator unit 40 and modules 18) remain relatively low and the variation of tube wall temperatures is generally small. This mode of operation is illustrated in FIG. 8 where the temperatures are plotted versus steam quality. The lower curve indicates the temperature of the fluid, in this case, water, as a function of steam quality. Fluid temperature increases with the heat supplies till it reaches the saturation temperature at the operating pressure and remains constant at the saturation temperature from 0% to 100% steam quality. Supplying heat beyond 100% quality, of course, would result in producing superheated steam.

The curve immediately above the fluid temperature curve represents the tube wall temperature for a moderate heat flux or energy transfer rate while the curve above that is for a high heat transfer rate. It is seen that for steam quality above 30%, the tube wall temperature can increase significantly as a function of steam quality for the same heat flux or energy transfer rate. Likewise, for steam quality above 30% the wall temperature varies considerably as well. However, for 10% to 30% steam quality, tube wall temperature shows only a small increase with heat transfer rate. Likewise, the tube wall temperature for a given heat transfer rate when producing 10% to 30% quality steam remains generally constant over that interval of steam quality.

While operating in a regime that produces 10% to 30% quality steam, robust water boiling occurs, producing a turbulent condition that is favorable for efficient heat transfer. This is typically referred to as the bubbling regime and it is in this regime where the present invention is most effective and efficient in terms of the basic design objectives for the forced circulation steam generator 10 and its use in the SAGD process discussed above and shown in FIG. 1. Further, operating in this regime avoids the development of hot spots on the heat transfer surfaces thereby maintaining effective heat transfer and improving the reliability.

In a typical design, the forced circulation steam generator of the present invention is capable of a maximum heat input of approximately 400 mm BTU/hr and a maximum steam output of approximately 353,000 lb/hr (160 ton/hr). The maximum steam pressure for a typical design would be approximately 2,300 PSIG. As noted above, the forced circulation steam generator 10 of the present invention is capable of producing greater than 99.5% quality steam with 2% or less of blow down. The turndown for the forced circulation steam generator 10 of the present invention is typically about 10 to 1, but a turndown of 30 to 1 is possible. The entire forced circulation steam generator 10 of the present invention can be delivered on a skid to an oil recovery area or facility which simplifies installation and reduces overall cost. The water treatment capacity of the forced circulation steam generator 10 of the present invention is similar to drum-type boilers, however, the power consumption is similar to once through steam generators.

The forced circulation steam generator 10 of the present invention and the system and process for recovering heavy oil has many advantages. First, the forced circulation steam generator includes 100% piggable circuits with a tolerance to sub-ASME quality water. In addition, the forced circulation steam generator of the present invention includes membrane water cooled walls with a 1% to 2% blow down while producing in some cases 99.5% pure steam. The design of the forced circulation steam generator of the present invention reduces maintenance time and cost, lowers furnace temperatures which yields a longer life, and avoids expansion issues that are prevalent with refractory seals and un-cooled tube supports. The water cooled furnace walls and the ability to cleaning by conventional pigging serve as insurance against water quality upsets. In the case of the design described and shown herein, flow is managed in two independent circuits. This makes the total control scheme for the forced circulation steam generator 10 simple and easy to execute. The forced circulation steam generator 10 can be operated at lower capacities and higher flows during water quality upsets. This reduces expensive down time associated with shut downs for short duration upsets.

The two main circuits, that is the circuits comprised of the evaporator unit 40 and the water cooled wall modules 18, are limited to producing a certain steam quality. In one design the steam quality in each circuit is limited to approximately 30% steam quality and operates in the robust bubbling regime which yields certainty in metal temperatures and improves reliability and turn down significantly. Finally, the forced circulation steam generator 10 reduces the footprint of the steam generating device for a given application and generally eliminates hot spot maintenance issues associated with refractory wall furnaces.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering oil and producing steam for injection into an injection well to assist in the recovery of oil, the method comprising:
    recovering an oil-water mixture from an oil bearing formation;
    separating oil from the oil-water mixture to produce an oil product and produced water where the produced water includes suspended solids and dissolved solids;
    directing the produced water having the suspended and dissolved solids to a treatment system;
    treating the produced water by removing suspended solids and dissolved solids from the produced water and producing treated water;
    directing the treated water to a forced circulation steam generator comprising a furnace having a burner, at least one water cooled wall and an evaporator unit;
    pumping a first portion of the treated water through at least one water cooled wall and pumping a second portion of the treated water through the evaporator unit in the furnace;
    heating the water passing through the water cooled wall to form a first water-steam mixture comprising approximately 10% to approximately 30% quality steam;
    heating the water passing through the evaporator unit to produce a second water-steam mixture comprising approximately 10% to approximately 30% quality steam;
    directing the first and second water-steam mixtures to a steam separator and separating steam from the first and second water-steam mixtures to form injection steam comprising 95% or more quality steam; and
    directing the injection steam into the injection well to facilitate the recovery of the oil-water mixture from the oil bearing formation.

2. The method of claim 1 wherein the forced circulation steam generator produces a blow-down stream that is 2% or less of the treated water directed to the forced circulation steam generator.

3. The method of claim 1 wherein the injection steam produced by the steam separator comprises 99% or more quality steam.

4. The method of claim 3 wherein the forced circulation steam generator produces a blow down stream that is 2% or less of the treated water directed to the forced circulation steam generator.

5. The method of claim 1 wherein the steam separator includes a steam drum and where the method further includes:
- directing the first and second water-steam mixtures from the furnace into the steam drum and separating steam from the first and second water-steam mixtures;
- directing the treated water into the steam drum;
- pumping the treated water from the steam drum through the water cooled wall and evaporator unit; and
- wherein the quantity of the treated water pumped from the steam drum through the water cooled wall and evaporator unit is more than five times the quantity of steam produced in the water cooled wall and evaporator unit.

6. The method of claim 1 including maintaining the flow of water to the furnace such that the flow of water to the water cooled wall and evaporator unit substantially exceeds the quantity of steam produced by the water cooled wall and evaporator unit.

7. The method of claim 1 including controlling the flow of the treated water to the furnace such that the steam quality of the water-steam mixture produced in each of the water cooled wall and evaporator unit is maintained at approximately 10% to approximately 30%.

8. The method of claim 1 wherein the steam separator includes a steam drum and the method further includes:
- directing the treated water into the steam drum;
- directing water from the steam drum to and through the water cooled wall and evaporator unit; and
- controlling the flow of water through the water cooled wall and evaporator unit as a function of a firing rate of the burner.

9. The method of claim 8 including controlling the flow of water through the water cooled wall and evaporator unit such that the quality of steam produced by each of the water cooled wall and the evaporator unit is approximately 10% to approximately 30% quality steam.

10. The method of claim 1 wherein the steam separator includes a steam drum and the method further includes:
- directing the treated water to the steam drum wherein the treated water mixes with water separated from the first and second water-steam mixtures to yield water held within the steam drum;
- directing water from the steam drum to at least two pumps that are operatively connected between the steam drum and the water cooled wall and evaporator unit;
- pumping a first portion of the water through a first line to and through the water cooled wall and pumping a second portion of the water through a second line to and through the evaporator unit; and
- generally limiting the quality of steam produced in each of the water cooled wall and evaporator unit to approximately 30% or less quality steam.

11. A method of recovering oil and producing steam for injection into an injection well to assist in the recovery of oil from an oil bearing formation, the method comprising:
- recovering an oil-water mixture from an oil bearing formation;
- separating oil from the oil-water mixture to produce an oil product and produced water where the produced water includes suspended solids and dissolved solids;
- directing the produced water having the suspended and dissolved solids to a treatment system;
- treating the produced water by removing suspended solids and dissolved solids from the produced water and producing treated water;
- directing the treated water to a forced circulation steam generator;
- pumping the treated water through the forced circulation steam generator;
- heating the water passing through the forced circulation steam generator to produce at least one water-steam mixture;
- limiting the steam produced in the forced circulation steam generator to 30% or less quality steam;
- generally maintaining the flow of treated water to the forced circulation steam generator such that the flow of water to the forced circulation steam generator is at least five times greater than the steam produced by the forced circulation steam generator;
- collecting the steam produced by the forced circulation steam generator and directing the collected steam into the injection well;
- wherein the forced circulation steam generator includes water cooled walls and an evaporator unit;
- pumping a first portion of the treated water through the water cooled walls and pumping a second portion of the treated water through the evaporator unit;
- heating the water passing through the water cooled walls to form a first water-steam mixture comprising approximately 10% to approximately 30% quality steam; and
- heating the water passing through the evaporator unit to produce a second water-steam mixture comprising approximately 10% to 30% quality steam.

12. The method of claim 11 wherein the collected steam comprises 95% or more quality steam and wherein the forced circulation steam generator produces a blow down stream that is 2% or less of the treated water directed to the forced circulation steam generator.

13. The method of claim 11 wherein the forced circulation steam generator includes a steam separator and the method including:
- directing the treated water to the steam separator;
- pumping water from the steam separator to and through water cooled walls forming a part of a furnace of the steam generator; and
- pumping water from the steam separator to and through an evaporator unit disposed in the furnace of the forced circulation steam generator;
- heating the water in the water cooled walls and the evaporator unit such that the steam quality produced in the water cooled walls and the evaporator unit is limited to 30% or less quality steam.

14. A method of recovering oil and producing steam for injection into an injection well to assist in the recovery of oil from an oil bearing formation, the method comprising:
- recovering an oil-water mixture from an oil bearing formation;
- separating oil from the oil-water mixture to produce an oil product and produced water where the produced water includes suspended solids and dissolved solids;
- directing the produced water having the suspended and dissolved solids to a treatment system;
- treating the produced water by removing suspended solids and dissolved solids from the produced water and producing treated water;
- directing the treated water to a forced circulation steam generator;
- pumping the treated water through the forced circulation steam generator;

heating the water passing through the forced circulation steam generator to produce at least one water-steam mixture;
limiting the steam produced in the forced circulation steam generator to 30% or less quality steam;
generally maintaining the flow of treated water to the forced circulation steam generator such that the flow of water to the forced circulation steam generator is at least five times greater than the steam produced by the forced circulation steam generator;
collecting the steam produced by the forced circulation steam generator and directing the collected steam into the injection well; and
wherein the forced circulation steam generator includes a steam separator and the method includes:
  i. directing the treated water to the steam separator;
  ii. pumping water from the steam separator to and through water cooled walls forming a part of a furnace of the steam generator;
  iii. pumping water from the steam separator to and through an evaporator unit disposed in the furnace of the forced circulation steam generator; and
  iv. heating the water in the water cooled walls and the evaporator unit such that the steam quality produced in the water cooled walls and the evaporator unit is limited to 30% or less quality steam.

15. The method of claim 14 wherein the collected steam comprises 95% or more quality steam and wherein the forced circulation steam generator produces a blowdown stream that is 2% or less of the treated water directed to the forced circulation steam generator.

\* \* \* \* \*